July 18, 1967 D. G. BROOKS 3,331,266
BORING TOOL
Filed July 6, 1965 2 Sheets-Sheet 1
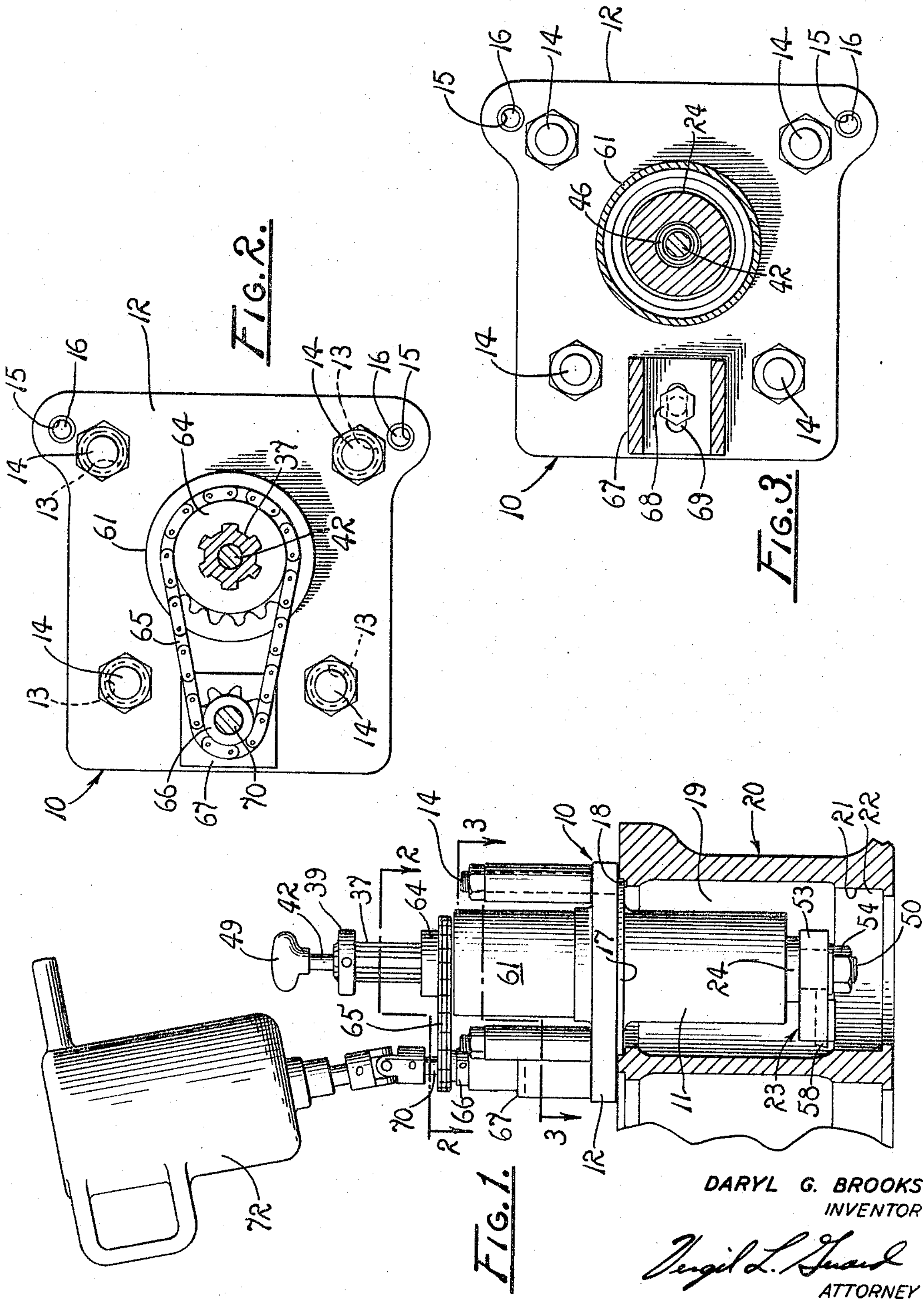
DARYL G. BROOKS
INVENTOR
ATTORNEY

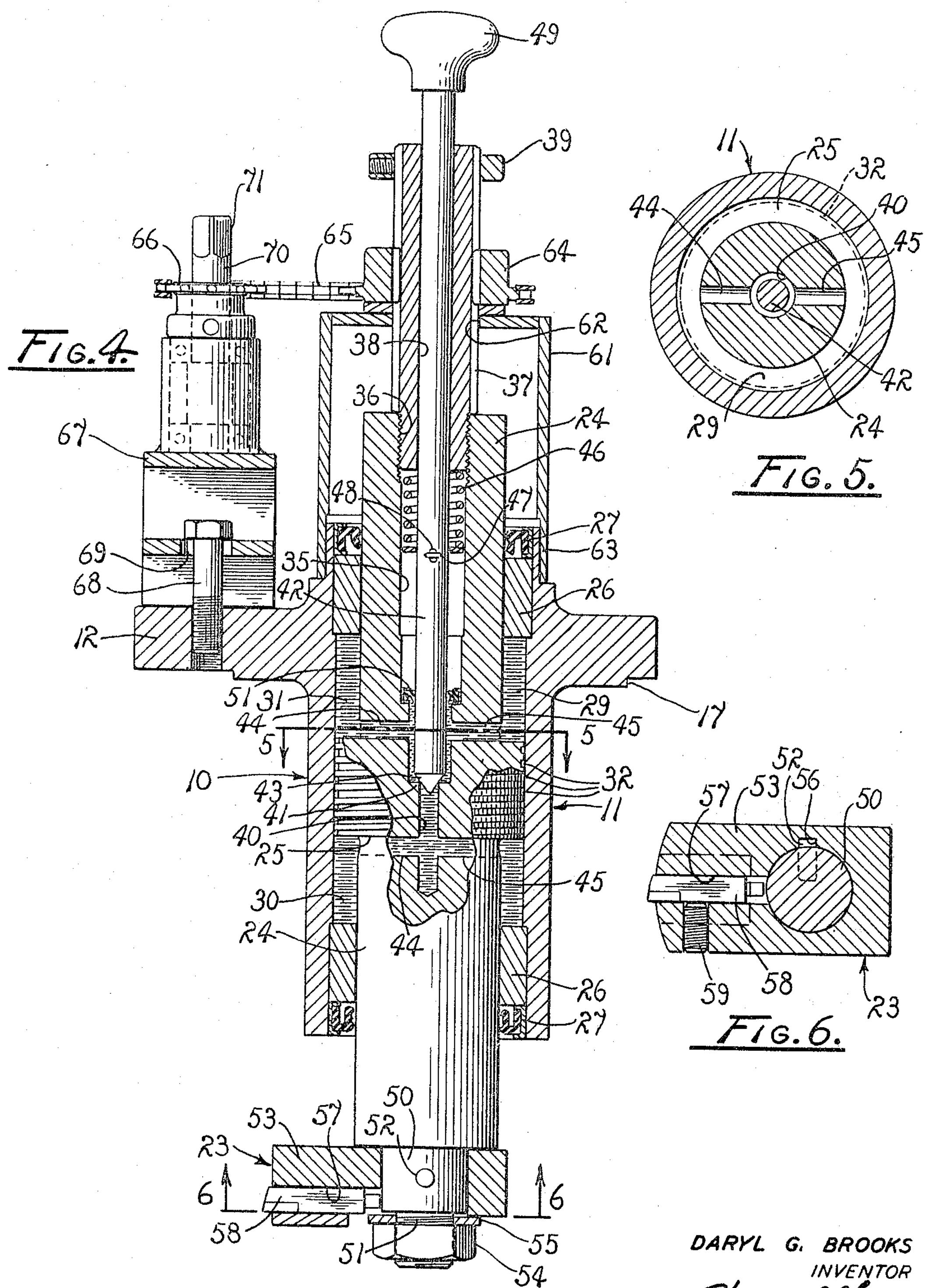
DARYL G. BROOKS
INVENTOR
ATTORNEY

United States Patent Office 3,331,266

Patented July 18, 1967

3,331,266

BORING TOOL

Daryl G. Brooks, Fresno, Calif.
(812 Barstow Ave., Clovis, Calif. 93612)

Filed July 6, 1965, Ser. No. 469,531
23 Claims. (Cl. 77—2)

This invention relates to boring tools generally and more particularly to cylinder boring tools used in the repair and maintenance of trucks and automobiles.

Machine tools for boring the cylinders of internal combustion engines have long been important in the repair and maintenance of such engines. Because of the heavy use given truck engines, their periodic overhaul is a relatively frequent occurrence. The better diesel engines are, therefore, constructed to make this overhaul as simple as possible. To simplify overhaul, the manufacturers of large diesel truck engines construct the engine block with the combustion cylinders formed by sleeves which are removable from the block. These removable cylindrical sleeves fit in chambers in the upper part of the block through which water is passed for cooling, and form a seal with the chamber walls at their lower ends to prevent the cooling water from passing into the oil pan.

In the Ford-Ferguson diesel engine, for example, the seal between the cylinder sleeves and the chamber walls is established by O-rings mounted in grooves formed in the chamber walls adjacent to the lower end of the cylinder sleeves. In the Cummings diesel engine, the O-rings are mounted in grooves on the lower end of the cylinder sleeves themselves, and the adjacent chamber walls form smooth cylindrical bores. In both cases, the seal prevents fluid communication between the chambers holding the cylinder sleeves in the upper part of the block through which the cooling liquid flows, and the oil pan.

In the operation of the engine, electrolysis causes wear of the surfaces adjacent the seal, which eventually results in leakage. When such conditions occur, overhaul of the engine becomes necessary.

In overhauling the engine, it is not sufficient to merely remove and replace the worn cylinder sleeves. It is also necessary to recondition the surface of the chamber walls adjacent the seal area in order to again effect a satisfactory seal. In an engine such as the Cummings diesel, where the chamber wall surface adjacent the lower end of the cylinder sleeves is merely a smooth bore, this reconditioning is carried out by boring out this portion of the chamber walls and then inserting a sizing sleeve to bring the diameter back to within the original tolerances. In the Ford-Ferguson engine, where the O-ring grooves are formed in the chamber walls rather than on the cylinder sleeves, the chamber walls are also bored out, however, the sizing sleeves which are inserted to bring the bore diameter back to the original tolerances are formed with grooves to hold the O-rings. In either case, the chamber walls must just be bored out and then brought back to their original diameter by sizing sleeves, sometimes also called lower seal area sleeves.

After the lower seal area sleeves or sizing sleeves have been inserted, new cylinder sleeves are placed in the engine and, since the mating surfaces on the lower portion of the cylinder sleeves and the adjacent area of the chamber walls have been restored to their original dimensions by the inserted lower seal area sleeves, an effective seal is once again established.

The tool which is the subject of this invention is especially designed to make this repair by boring out the chamber walls in the lower seal area, so that the lower seal area sleeves can be inserted and the new seal achieved. Particularly, the tool permits boring out of the lower seal area without requiring removal of the engine block from the chassis of the vehicle.

To set my tool up for use requires only that the head of the engine be removed, together with the piston and piston rods and cylinder sleeves. The studs which hold the head on the block and the dowels which position it, do not have to be removed. My tool is mounted on the block in alignment with a particular cylinder hole by utilizing the studs and dowels and is secured by threading head nuts on the studs.

Other tools are available which can perform the boring operation described, however, these tools have several significant disadvantages. First, they are considerably larger, heavier and more expensive than my tool. Second, most of these tools require the engine block to be removed from the chassis before the boring operation can be accomplished. Third, these tools, because of their complexity, require a machinist rather than a mechanic to operate them. My tool is also adaptable to other cylindrical boring operations with a minimum of modification.

It is, therefore, a major object of my invention to provide a tool for performing cylindrical boring operations which is portable, less complex and considerably less expensive than those tools heretofore known.

It is also an object of this invention to provide a tool of the type described which can be utilized for boring cylinders in internal combustion engines without removing the engine block from the vehicle chassis or removing the head studs and dowel pins from the engine block.

It is another object of my invention to provide a tool of the type described in which the linear travel of the cutting tool is hydraulically actuated.

It is still another object of my invention to provide a tool of the type described in which a one-half inch electrical hand drill can be utilized as the drive source.

It is still a further object of my invention to provide a tool of the type described which can be mounted to the engine block by use of the head studs, is light enough to be moved by one man from cylinder to cylinder, and is self-aligning to the cylinders of a particular engine.

It is yet another object of my invention to provide a tool of the type described which is easy to maintain and practically foolproof in operation.

These and other objects and advantages of my invention will become more readily apparent from the following detailed description and the accompanying drawings in which:

FIGURE 1 is a side elevational view, showing a tool embodying my invention on an engine block;

FIGURE 2 is a sectional plan view of the tool taken on line 2—2 in FIGURE 1;

FIGURE 3 is a sectional plan view of the tool taken on line 3—3 in FIGURE 1;

FIGURE 4 is an enlarged side elevational view of the tool in partial cross-section;

FIGURE 5 is a sectional plan view taken on line 5—5 in FIGURE 4, and

FIGURE 6 is a sectional bottom view taken on line 6—6 in FIGURE 4.

Referring now to the drawings and particularly FIGURE 1 thereof, the numeral 10 refers generally to a boring tool constituting a preferred embodiment of my invention. The boring tool 10 has a housing 11 made of a cylindrical casting, having an inside diameter of 4 to 5 inches. A mounting flange 12 is affixed to the periphery of the cylindrical housing 11 at about the midpoint thereof. The mounting flange 12 has mounting holes 13 at the corners thereof, as best seen in FIGURES 2 and 3, which are axially directed with respect to the cylindrical housing 11. The mounting holes 13 are interrelated in a pattern adapted to receive the head studs 14 on the particular make of engine for which the tool is designed.

For the sake of easy illustration, I have chosen a tool designed to fit the Cummings diesel engine. The mounting flange 12 also has dowel holes 15 designed to align with head dowels 16, which extend from the block of the Cummings engine.

Extending from one side of the mounting flange 12 in axial alignment with the housing 11 is a cylindrical land 17. The outside diameter and thickness of the cylindrical land 17 are adapted to fit the counter-bore 18 in the top portion of the cylinder holes 19 of engine block 20. The cylindrical land 17 is closely machined to assure a good alignment with the cylinder when the land is snugly fitted in the cylinder counter-bore. The housing 11, flange 12, and cylindrical land 17 are all so arranged that when the flange is secured to the block of the engine, the axis of housing 11 is precisely aligned with the axis of the engine cylinder to which the tool is mounted.

The engine block 20 (shown in cross-section in FIGURE 1) has a cylindrical bore 21 at the lower seal area 22. The boring tool 10 has a cutting bit assembly 23 at its lower end, which is disposed in cutting engagement with the cylindrical bore 21 when the tool is mounted on the engine block 20, as above described. Upon rotation and downward movement of the cutting bit assembly 23, as will be later described, the surface of cylindrical bore 23 is bored out.

Referring now to FIGURE 3, the housing 11 has a drive shaft 24 rotatably mounted therein which carries a piston 25. The drive shaft 24 is axially disposed with respect to the housing 11, but is longer so that it extends beyond the housing at both ends. The piston 25 is affixed to the drive shaft 24 approximately intermediate the ends thereto. Drive shaft 24 is rotatably mounted to the housing 11 by means of bushings 26 disposed at the upper and lower ends of the housing. Bushing seals 27 are provided at each end of the housing just outboard of the bushings 26 to prevent fluid communication between the outside and the inside of the housing.

By reason of this structure, two chambers are formed inside housing 11, an upper chamber 29, above piston 25, and a lower chamber 30, below piston 25. These chambers contain a suitable hydraulic fluid 31. The piston 25, which separates the chambers, has helical grooves 32 about its periphery so that upon rotation it transfers hydraulic fluid 31 from lower chamber 30 to upper chamber 29. As this transfer is made, piston 25 is moved downwardly in the housing 11, until it eventually transfers all the fluid 31 from lower chamber 29 into upper chamber 30, and reaches its lower limit. Since piston 25 is affixed to drive shaft 24, the drive shaft is carried downwardly with respect to housing 11 as the piston moves downwardly.

Drive shaft 24 is equipped with an axial bore 35 at its upper end which extends downwardly to the piston 25. The drive shaft bore 35 has threads 36 adjacent its upper end and a spline 37 is threadedly engaged therewith and extends upwardly therefrom.

The spline 37 also has an axial bore 38 similar to and aligned with the drive shaft bore 35, which extends completely therethrough. A stop collar 39 is affixed to the spline 37 near its uppermost end to limit the downward movement of the spline and drive shaft.

The piston 25 has an axial bore 40 which communicates with and is aligned with the bores 35 and 38. The piston bore 40 has a valve seat 41 formed therein. A valve stem 42 is disposed in the aligned axial bores 35, 38 and 40, and has a valve face mounted on its lower end which is mated to the valve seat 41, and upon engagement therewith, closes piston bore 40. The piston bore 40 provides direct communication between the upper chamber 29 and the lower chamber 30, by means of two pairs of passages 44 and 45, which are disposed radially in drive shaft 24, one pair above piston 25, and the other just below it, and connect piston bore 40 with the respective upper and lower chambers 29 and 30. The passages 44 and 45 thus cooperate with piston bore 40 to provide a channel through which hydraulic fluid 31 can be passed from upper chamber 29 to lower chamber 30, when piston bore 40 is open to permit movement of the piston 25 through the fluid 31 inside of housing 11, rapidly and without necessitating rotation of the piston.

To keep the valve face 43 normally engaged with the valve seat 41, so that piston bore 40 is normally closed, the valve stem 42 is spring loaded downwardly in the bores 35, 38 and 40, by means of a compression spring 46. The compression spring 46 is captured between the lowermost portion of the spline 37, and a cotter pin 47 disposed through a diametrical hole 48 in the valve stem 42. A handle 49 is provided on the upper end of the valve stem 42 as a means of manually urging the valve stem upwardly against spring 46. Adjacent the lower end of drive shaft bore 35, a stem seal 51 is provided about the valve stem 42 to prevent the fluid 41 from escaping upwardly through the bores 35 and 38.

To provide means for mounting the cutting bit assembly 23, drive shaft 24 is reduced to form a stud 50 at its lower end, which has threads 51 and a key pin 52. An elongated tool bar 53 is mounted on stud 50 by means of a nut 54 and lock washer 55, and is locked thereto by a key slot 56 (see FIGURE 6).

Tool bar 53 has a slot 57 extending radially from its center through one end in which a tool bit 58 is inserted. Tool bit 58 is held in the slot 57 by means of a set screw 59, which is threaded into tool bar 53.

At the upper end of drive shaft 24 a cap 61 is provided which mounts on the upper portion of housing 11 and has an opening 62 in its top, which passes the spline 37. The cap 61 is shrink-fitted to the housing 11 at its lower end 63, to keep it in place. Above cap 61 a large sprocket gear 64 is mounted on the spline 37, by means of a grooved bore mated to the teeth of the spline. Thus mounted, the large sprocket gear 64 is movable axially with respect to said spline, but not rotatably. A spacer 65 is provided between the large sprocket gear 64 and cap 61, to prevent frictional contact.

The large sprocket gear 64 is driven through a chain 65 by a small sprocket gear 66. Small sprocket gear 66 is mounted on a pedestal 67 on one side of flange 12, which is held in place by a lock bolt 68, set in an elongated slot 69. Elongated slot 69 is aligned with the longitudinal axis of chain 65 so that the chain tension may be adjusted by sliding pedestal 67 closer to or further from large sprocket gear 64 and then locking it in place with lock bolt 68.

Small sprocket gear 66 is mounted on and keyed to a stub shaft 70, which is in turn rotatably mounted in pedestal 67, and disposed substantially vertically. The upper end of stub shaft 70 extends above small sprocket gear 66 and has a square-faced tip 71 adapted to fit the chuck of a one-half inch electric powered shop hand drill 72 of the type commonly in use in repair shops.

To commence the boring operation, my tool is mounted to one cylinder hole 19 of an engine block 20, without removing the block from the vehicle chassis, as described above. It is properly positioned in the cylinder hole 19 by inserting the head dowels 16 into dowel holes 15 and head studs 14 into mounting holes 13, and is secured in place by setting spacers on the head stud 14, and threading on head nuts. Accurate alignment of the boring tool axis with the cylinder hole axis is achieved by snugly fitting land 17 into the counterbore 18 at the top of the cylinder. In this position the cutting bit assembly 23 is disposed adjacent the cylindrical wall 21 of the lower seal area 22, as explained above.

Before starting the boring operation, the drive shaft 24 is elevated to its uppermost position by lifting handle 49. This, in turn, raises valve stem 42 in bores 35, 38 and 40 against compression spring 46. Valve face 43 is thus separated from valve seat 41, opening piston bore 40, and fluid 31 in upper chamber 29 escapes through bore 40 and the radial passages 44 and 45 into lower chamber 30.

This permits piston 25 to be drawn upwardly along with drive shaft 24, with a minimum of resistance, as explained above.

When piston 25 engages the upper bushing 26, the drive shaft 24 is at its uppermost position and tool bit 58 is disposed adjacent the uppermost portion of the wall of cylindrical bore 21. Handle 49 is then released, and the valve stem 42 is driven downwardly by spring 46 until valve face 43 engages valve seat 41 and closes bore 40. Drive shaft 24 is supported in this poistion by hydraulic fluid 31 which is then captured in lower chamber 30 beneath the piston 25.

The electric powered hand drill 72 is then energized, rotating stub shaft 70 and small sprocket gear 66, which in turn rotate large sprocket gear 64 through drive chain 65. Large sprocket gear 66 rotates spline 37 and, in turn, drive shaft 24 and piston 25. The cutting bit assembly 23 rotates with drive shaft 24 and tool bit 58, engages and cuts the upper portion of the cylindrical bore 21 of lower seal area 22. Slow downward progression of the cutting bit assembly 23 is achieved when the helical grooves 32 on piston 25, which is rotated with drive shaft 24, transfer hydraulic fluid 31 from lower chamber 30 into upper chamber 29. The quantity of fluid in lower chamber 30 is thus gradually reduced while the quantity of fluid in upper chamber 29 is increased and piston 25 moves slowly downward, carrying with it drive shaft 24 and cutting bit assembly 23, a result of the simultaneous rotation and linearly downward movement of cutting bit assembly 23, tool bit 58 bores out the cylindrical bore 21.

Since the downward progression is proportionate to the rotation speed, the helical grooves 32 can be so arranged to provide a proper ratio of linear movement to rotation speed for optimum cutting efficiency. Once established, this ratio is maintained even though different driving speeds are utilized.

When enough of the hydraulic fluid 31 in lower chamber 30 has been lifted into upper chamber 29 to carry stop collar 39 on spline 37 into engagement with large sprocket gear 66, the downward travel of drive shaft 24 ceases to insure a complete bore out, the location of stop collar 39 on spline 37 is so arranged that tool bit 58 is carried below the lowermost portion of the cylindrical bore 21 before the downward movement ceases.

The boring tool 10 is then moved to another cylinder hole 19, mounted in place and after elevating drive shaft 24, by raising handle 49, is again ready for boring.

From this description, it will be understood that though my boring tool herein described was adapted for use in a Cummings diesel engine, by simple modification it can be arranged for use on other engines, both diesel and gasoline. Furthermore, my tools can be readily adapted to other boring jobs as well. Particularly, because of its hydraulic linear feed, my boring tool is compact, portable, and relatively inexpensive, and yet can do accurate boring jobs which prior hereto required equipment that was larger, heavy and considerably more expensive.

Because the tool is easily mounted and aligned for engine cylinder work, it can be operated by a mechanic. Boring tools heretofore known required a machinist for this work, because alignment and operation were much more complex.

From this description, it will be appreciated that the particular embodiment of my invention, herein described, is capable of obtaining the objects and proving the advantages heretofore attributed to it. It should be understood, however, that I do not mean to limit myself to the particular details described, except as set forth in the appended claims.

I claim:

1. A boring tool comprising:

a housing disposed about on axis;

a drive shaft in said housing in axial alignment with said axis, and simultaneously movable with respect to said housing in rotation about and linearly along said bore axis;

rotary drive means drivingly interconnected with said drive shaft for rotation thereof;

a chamber operatively associated with said drive shaft and housing, said chamber having hydraulic fluid therein;

a piston operatively associated with said drive shaft and disposed in said chamber;

pump means operatively associated with said piston and disposed in interconnecting relationship with said chamber on both sides of said piston, said pump means being rotatable by said rotary drive means;

a cutting tool mounted on said drive shaft and movable therewith; and mounting means on said housing for mounting said boring tool to designated work.

2. A boring tool as described in claim 1, in which said mounting means includes alignment means for accurately aligning the axis of said housing with the axis of a designated bore.

3. A boring tool as described in claim 1 in which said pump means comprises helical grooves in the periphery of said piston disposed in fluid communication with both sides of said piston.

4. A boring tool for boring out cylinders in engine blocks comprising:

a housing having a cylindrical bore therethrough;

a drive shaft mounted in said housing bore in axial alignment therewith, and simultaneously movable with respect to said housing in rotation about and linearly along the axis of said bore;

rotary drive means drivingly interconnected with said drive shaft for rotation thereof;

linear drive means operatively associated with said drive shaft and rotatable by said rotary drive means for driving said drive shaft linearly along said bore axis;

said linear drive means having a hydraulically actuated piston;

a cutting tool affixed adjacent one end of said drive shaft and movable therewith; and mounting means on said housing for mounting said boring tool on one cylinder of an engine block with the axis of said housing bore aligned with the axis of said cylinder.

5. A boring tool for boring out cylinders in engine blocks as described in claim 4, in which said mounting means includes a cylindrical land disposed to engage and adapted to snugly fit into the upper portion of a cylinder in an engine block to which said tool is mounted, said cylindrical land being disposed in axial alignment with the axis of said housing.

6. A boring tool for boring out cylinders in engine blocks as described in claim 4, in which said mounting means includes a flange mounted on said housing intermediate the ends thereof; means defining holes in said flange disposed to receive and pass the head studs in said engine block adjacent the cylinder on which said boring tool is mounted; means defining recesses in said flange disposed to receive the head dowels in said engine block adjacent the cylinder on which said boring tool is mounted; and a cylindrical land on said flange disposed on the side adjacent said engine block and concentrically about the axis of said housing, said land having a diameter slightly less than the diameter of the upper portion of said cylinder for snug fitting therein.

7. A boring tool comprising:

a housing;

mounting means on said housing disposed to secure said housing in axial alignment with a cylinder to be bored;

a cutting tool;

tool support means operatively associated with said housing and cutting tool, and disposed therebetween said tool support means mounting said cutting tool for simultaneous rotary and linear movement with respect to said housing;

rotary drive means operatively associated with said housing and tool support means, and rotating said tool support means with respect to said housing; and linear feed means operatively associated with said housing and tool support means, said linear feed means having a piston with helical grooves disposed in a fluid filled chamber.

8. A boring tool for boring cylinders in the block of an internal combustion engine, comprising:

a housing having a generally cylindrical axial bore;

a mounting flange on said housing disposed perpendicular to the axis of said bore, and substantially intermediate the ends thereof, said mounting flange mounting said cylinder with its axis generally vertical and its lower portion disposed in a cylinder of said internal combustion engine;

means defining a plurality of holes in said flange disposed with their axis substantially parallel to the axis of said housing bore, and located to correspond with the pattern of head studs extending from the block of a particular internal combustion engine;

a cylindrical land formed integral with said flange and disposed on a lower side thereof concentric with the axis of said housing bore, said land having a thickness and outside diameter of such dimensions as to snugly engage the upper portion of the cylinders of said particular internal combustion engine;

a drive shaft disposed in said housing bore in axial alignment therewith and extending beyond the lower end of said housing;

a cutting tool adjustably mounted adjacent the lower end of said drive shaft and disposed to engage the walls of said internal combustion engine cylinder;

bearing means disposed in said housing bore in engagement with said drive shaft and mounting said drive shaft for rotary and axial movement with respect to said housing bore;

means defining a chamber in said housing bore intermediate the ends thereof and surrounding said drive shaft, hydraulic fluid disposed in said chamber and filling the same;

a piston fixedly mounted on said drive shaft substantially intermediate the ends thereof, and disposed in said chamber with its periphery in bearing engagement with the walls of said housing bore for rotary and linear movement with respect thereto, said piston having helical grooves in said periphery which communicate from the upper side to the lower side thereof;

means defining an axial passage in said drive shaft communicating from the upper end thereof to a point below the lower side of said piston;

means defining a radially directed upper passage in said drive shaft disposed above the upper side of said piston and communicating between said axial bore and said chamber;

means defining a radially directed lower passage in side drive shaft disposed below the lower side of said piston and communicating between said axial bore and said chamber;

means defining a valve seat in said axial bore between said upper passage and said lower passage;

a valve stem disposed in said axial bore and having a face surface on the lower end thereof disposed to engage the surface of said valve seat means;

spring means urging said valve stem downwardly against said valve seat;

handle means on the upper end of said valve stem and extending above said drive shaft for displacing said valve stem upwardly against the urging of said spring means; and a spline and gear drive mechanism mounted on said housing and interconnected to said drive shaft, said drive mechanism being adapted for rotation by a one-half inch powered hand drill.

9. A boring tool comprising:

a cutting tool;

support means mounting said cutting tool for rotary and linear movement simultaneously about and along a predetermined bore axis;

rotary drive means interconnected with said cutting tool for rotation thereof; and linear drive means interconnected with said cutting tool, said linear drive means having piston means disposed in a chamber filled with hydraulic fluid and pump means rotatable by said rotary drive means and disposed to pump said hydraulic fluid from one side of said piston to the other.

10. A boring tool as described in claim 9, in which said linear drive means has a passage interconnecting one side of said piston to the other side of said piston, and valve means disposed in said passage for controlling fluid flow therethrough;

helical grooves in the periphery of said piston disposed for fluid communication from one side of said piston to the other; and means interconnecting said piston to said rotary drive means for rotation thereof.

11. A boring tool comprising:

mounting means mounting said boring tool to designated work in alignment with a predetermined bore axis;

a tool support operatively associated with said mounting means and movable with respect thereto simultaneously in rotation about and linearly along said bore axis;

rotary drive means drivingly connected with said tool support and rotatably driving said tool support with respect to said mounting means;

a drive converter operatively associated with said tool support and rotatable by said rotary drive means, said drive converter including hydraulically actuated piston means, and being operable upon rotation by said rotary drive means to drive said tool support linearly along said bore axis; and a cutting tool operatively associated with said tool support means and movable therewith.

12. A boring tool comprising:

mounting means mounting said boring tool to designated work in alignment with a predetermined bore axis;

a tool support operatively associated with said mounting means and movable with respect thereto simultaneously in rotation about and linearly along said bore axis;

rotary drive means drivingly connected with said tool support and rotatably driving said tool support with respect to said mounting means;

a drive converter operatively associated with said tool support and rotatable by said rotary drive means, said drive converter, including a piston disposed in a chamber filled with hydraulic fluid and pump means disposed in fluid communication with said chamber and both sides of said piston, and being operable upon rotation by said rotary drive means to drive said tool support linearly along said bore axis; and a cutting tool operatively associated with said tool support means and movable therewith.

13. A boring tool comprising:

a cutting tool;

support means mounting said cutting tool for rotary and linear movement simultaneously about and along a predetermined bore axis;

rotary drive means interconnected with said cutting tool for rotation thereof;

a chamber operatively associated with said support means, said chamber having a longitudinal axis disposed parallel to said predetermined bore axis;
hydraulic fluid in said chamber; and
a piston disposed in said chamber with its periphery in sliding engagement with a wall thereof, and movable to and fro along the longitudinal axis of said chamber, said piston having a passage therethrough in fluid communication between said one side and said other side, a valve seat disposed in said passage, and a manually operable valve stem disposed in said passage in normally closed relationship with said valve seat.

14. In a boring tool having mounting means, cutting means movable with respect to said mounting means in rotation about and linearly along a bore axis, and drive means for driving said cutting means, a drive converter comprising:
a hydraulically actuated piston operatively associated with said cutting means and said drive means for converting between rotary and linear movement.

15. A boring tool drive converter as described in claim 14, including a chamber with hydraulic fluid containing said piston, and a pump interconnecting portions of said chamber disposed on opposite sides of said piston.

16. A boring tool drive converter as described in claim 14, including a chamber with hydraulic fluid containing said piston, and helical grooves in the periphery of said piston disposed for fluid communication between the portion of said chamber on one side of said piston and the portion on the other.

17. In a boring tool, the combination of mechanical rotary drive means and hydraulic linear drive means, in which said hydraulic linear drive means includes a piston disposed in a fluid filled chamber, said piston having a helical passage interconnecting portions of said chamber on opposite sides of said piston.

18. In a boring tool, the combination of mechanical rotary drive means and hydraulic linear drive means, in which said hydraulic linear drive means includes a chamber, fluid in said chamber, and a piston interconnected with and rotatable by said rotary drive means, said piston being disposed in said chamber and movable reciprocally with respect thereto, and said piston having pump mean operatively associated therewith and interconnected with portions of said chamber on opposite sides of said piston, said pump means being actuatable upon rotation of said piston to pump fluid from the portion of said chamber on one side of said piston to a portion of said chamber on the other side of the said piston.

19. A work engaging tool comprising:
work engaging means;
support means mounting said work engaging means for simultaneous rotary and linear movement about and along predetermined axis;
rotary drive means interconnected with said support means and said work engaging means for rotatably driving said work engaging means; and
linear drive means interconnected with said work engaging means, said linear drive means having a chamber, hydraulic fluid filling said chamber; piston means disposed in said chamber, and pump means operatively associated with said piston means and actuatable by said rotary drive means to pump hydraulic fluid from one side of said piston to the other.

20. A work engaging tool comprising:
work engaging means;
support means mounting said work engaging means for linear movement with respect thereto;
a drive converter interconnected with said work engaging means, and said support means, said drive converter having a chamber, hydraulic fluid in said chamber, piston means disposed in said chamber, and pump means in said chamber operatively associated with said piston means, said pump means being interconnected with portions of said chamber on opposite sides of said piston and actuatable to pump said hydraulic fluid from a portion of said chamber on one side of said piston to a portion of said chamber on the other side of said piston; and
drive means interconnected with said pump means for actuation thereof.

21. A work engaging tool comprising:
work engaging means;
support means mounting said work engaging means for linear movement with respect thereto;
a drive converter interconnected with said work engaging means, said drive converter having a chamber with an axis disposed in alignment with the path of linear movement of said work engaging means, hydraulic fluid in said chamber, and piston means disposed in said chamber and simultaneously movable with respect thereto both rotatably and reciprocally about and along said chamber axis, said piston means having means defining a passage therein interconnecting portions of said chamber on opposite sides of said piston means and disposed to engage and pump said hydraulic fluid therethrough from a portion of said chamber on one side of said piston means to a portion of said chamber on the other side of said piston means upon rotation thereof; and
drive means interconnected with said piston means for imparting rotary movement thereto.

22. A work engaging tool as described in claim 21 in which said drive converter includes means defining a second passage in said piston means interconnecting portions of said chamber on opposite sides of said piston means, and valve means disposed in said second passage for controlling fluid flow therethrough.

23. In a work engaging tool having mounting means for mounting said tool to the work, work engaging means movable linearly with respect to said mounting means, and drive means for driving said work engaging means, comprising:
a cylinder with hydraulic fluid therein operatively associated with said mounting means and having an axis parallel with the path of linear movement of said work engaging means;
a piston disposed in said cylinder for simultaneous movement both rotary and reciprocal about and along said cylinder axis, said piston having a helical passage therein interconnecting the opposite sides thereof and disposed to engage and pump said hydraulic fluid therethrough upon rotation thereof;
means interconnecting said piston to said work engaging means; and
rotary drive means drivingly connected to said piston for rotation thereof.

References Cited

UNITED STATES PATENTS

| | | | |
|---|---|---|---|
| 1,782,910 | 11/1930 | Rickette | 77—2 |
| 2,267,837 | 12/1941 | Petersen | 77—2 |
| 2,669,887 | 2/1954 | Rees | 77—2 |
| 2,777,339 | 1/1957 | Hess | 77—2 |

WILLIAM W. DYER, JR., *Primary Examiner.*
G. A. DOST, *Assistant Examiner.*